(12) United States Patent
Derrick

(10) Patent No.: US 6,889,436 B2
(45) Date of Patent: May 10, 2005

(54) METHOD OF PRODUCING A STEERING WHEEL AND STEERING WHEEL

(75) Inventor: John-Oliver Derrick, Hettstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/143,407

(22) Filed: May 10, 2002

(65) Prior Publication Data

US 2002/0170379 A1 Nov. 21, 2002

(30) Foreign Application Priority Data

May 15, 2001 (DE) .......................................... 101 23 520

(51) Int. Cl.[7] .............................. B21D 53/26; G05G 1/10
(52) U.S. Cl. ....................... 29/894.1; 29/527.4; 74/552; 264/46.7
(58) Field of Search ........................ 264/46.7; 29/894.1, 29/509, 527.1, 527.4; 74/552

(56) References Cited

U.S. PATENT DOCUMENTS

| | | | | | |
|---|---|---|---|---|---|
| 2,041,739 A | * | 5/1936 | Beck | ........................... | 74/552 |
| 2,657,589 A | * | 11/1953 | Sampson | ..................... | 74/552 |
| 3,800,620 A | * | 4/1974 | Bela | ............................ | 74/552 |
| 3,977,271 A | * | 8/1976 | Becker | ......................... | 74/552 |
| 4,644,817 A | * | 2/1987 | Albrecht et al. | .............. | 74/552 |
| 5,988,014 A | * | 11/1999 | Liesenfeld et al. | ........... | 74/552 |
| 6,098,286 A | * | 8/2000 | Kreuzer | ..................... | 29/894.1 |
| 6,367,351 B2 | * | 4/2002 | Hosoi et al. | .................. | 74/552 |
| 2002/0062712 A1 | * | 5/2002 | Miltenberger | ................ | 74/552 |

FOREIGN PATENT DOCUMENTS

| | | |
|---|---|---|
| DE | 19632317 C1 | 1/1998 |
| DE | 19724073 A1 | 1/1998 |

* cited by examiner

*Primary Examiner*—Marc Jimenez
(74) *Attorney, Agent, or Firm*—Tarolli, Sundheim, Covell & Tummino L.L.P.

(57) ABSTRACT

The invention relates to a method of producing a steering wheel that comprises a closed annular steering wheel rim and spokes, and further comprises a steering wheel skeleton as well as a sheathing therefore, the sheathing being one of a foam covering and a leather covering that surrounds the steering wheel skeleton. The method comprises the following steps: a) the one-piece steering wheel skeleton is produced, it having, in order to form the steering wheel rim, a closed annular portion the cross-section of which has an open hollow profile; b) a body that serves as a spacer is placed in the open hollow profile in order to almost completely fill the hollow profile, and; c) the steering wheel skeleton is provided with the sheathing at least in an area of the steering wheel rim. The invention further relates to a steering wheel produced by such method.

8 Claims, 2 Drawing Sheets

METHOD OF PRODUCING A STEERING WHEEL AND STEERING WHEEL

TECHNICAL FIELD

The invention relates to a method for producing a steering wheel as well as to a steering wheel produced by such method.

BACKGROUND OF THE INVENTION

The manufacture of vehicle steering wheels is done, according to DE 197 24 073 A1, by stamping out a sheet metal part that is deformed after the stamping procedure into a one-piece sheet metal skeleton. In the area of the closed annular portion, which forms the skeleton in the area of the steering wheel rim, this annular portion is bent, for example, by deep drawing, to form a hollow profile that is not completely closed. During the subsequent applying of foam onto the skeleton, the objective is for the foam to lie as uniformly as possible over the outer surface, although this is not always easy to achieve because of the contours of the skeleton.

For example, if the steering wheel skeleton is only covered with leather, a relatively high effort is necessary to almost completely close the cross-section of the skeleton in the area of the steering wheel rim. An almost complete closing, however, is desired so that, when the driver compresses the steering wheel rim, he/she cannot push the leather into the inside of the hollow profile.

BRIEF SUMMARY OF THE INVENTION

The invention provides a method with which the production of a high-quality steering wheel can be accomplished very cost-effectively.

This is achieved by a method of producing a steering wheel that comprises a closed annular steering wheel rim and spokes, and further comprises a steering wheel skeleton as well as a sheathing therefore, the sheathing being one of a foam covering and a leather covering that surrounds the steering wheel skeleton. The method comprises the following steps: a) the one-piece steering wheel skeleton is produced, it having, in order to form the steering wheel rim, a closed annular portion the cross-section of which has an open hollow profile; b) a body that serves as a spacer is placed in the open hollow profile in order to almost completely fill the hollow profile, and; c) the steering wheel skeleton is provided with the sheathing at least in an area of the steering wheel rim. Preferably, the profile has only one open side.

In the method according to the invention, before or after the production of the hollow profile, a separate body is laid into the open hollow profile in order to fill it. This body can be made inexpensively, for example, out of cellulose. In this manner, no more foam can get into the open profile, which improves the quality of the foam-cased product. Moreover, relatively expensive foam can be saved which would otherwise get into the inside of the hollow profile. The leather-covering, without prior foam-casing, is likewise facilitated because, although the hollow profile is open, it gives a closed impression towards the outside due to the inserted spacer. Depending on the material used for the body, it can also bring about an additional improvement in the stability of the steering wheel rim. The stability improvement is especially achieved if in step b) the body is attached in the hollow profile, for example, by means of a joining method or with an adhesive. In this case, the result is a sandwich structure of the steering wheel rim.

According to one embodiment, the invention provides that, between steps b) and c), the steering wheel skeleton is deformed in the area of the annular portion in such a way that the hollow profile is further closed. As a result of this further closing of the hollow profile, it acquires a greater strength.

According to a preferred embodiment, it is provided that, after the closing of the profile, the body fills the inside of the hollow profile to such an extent that any penetration of foam into the inside of the hollow profile is prevented.

The steering wheel skeleton is preferably made of sheet metal that is deformed in the area of the annular portion so as to form the open hollow profile. A sheet metal skeleton stands out for the simple production effort it entails.

The material of the body can preferably have a far lower tensile and flexural strength than the material of the skeleton.

The steering wheel according to the invention, which likewise has the above-mentioned advantages, is distinguished in that the one-piece steering wheel skeleton has a closed annular portion to form the steering wheel rim, the cross-section of the steering wheel rim having an open hollow profile, a body that serves as a spacer being present in the open hollow profile and almost completely filling the hollow profile, and the steering wheel skeleton being provided with a sheathing in the nature of a foam covering and/or a leather covering at least in the area of the steering wheel rim.

DETAILED DESCRIPTION OF THE PREFERRED EMBODIMENTS

Figure 1:
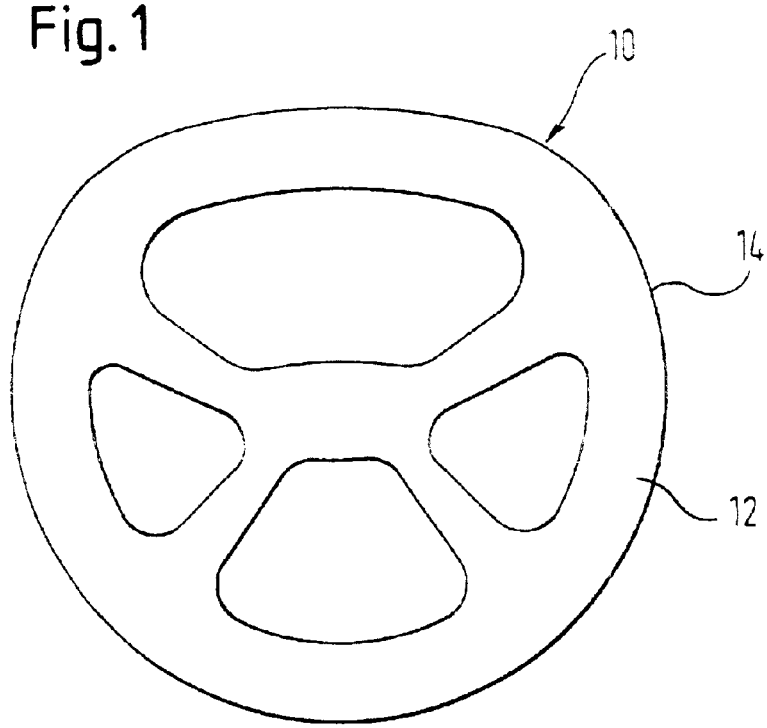
FIG. 1 shows a metal skeleton of a steering wheel according to the invention that is made by means of the method according to the invention.
Figure 2:
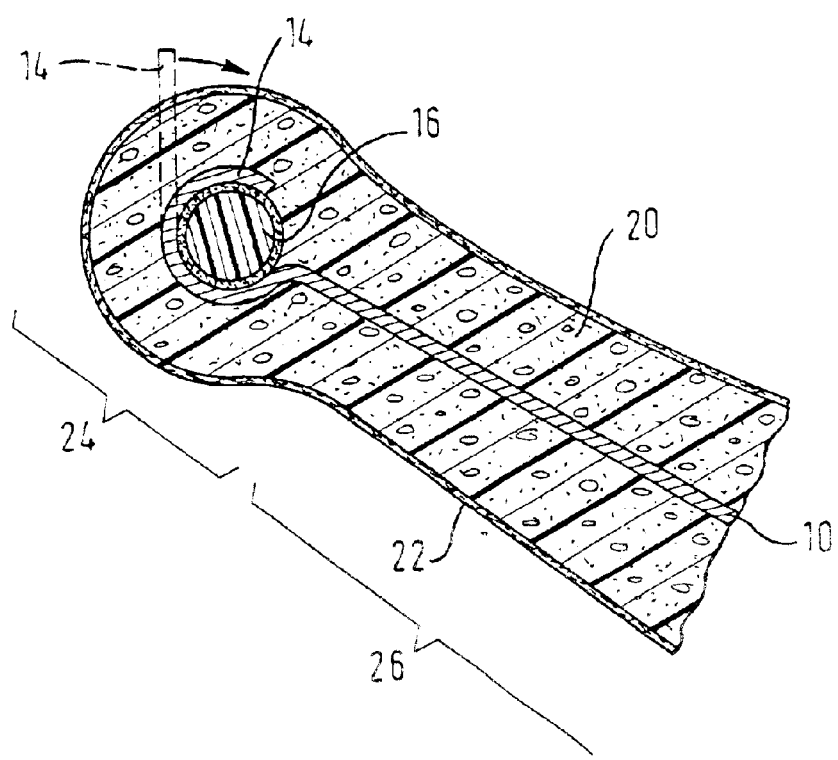
FIG. 2 shows a cross-section through a steering wheel made by means of the method according to the invention in a first embodiment in the area along a spoke and perpendicular to the steering wheel rim.

FIG. 1 shows a one-piece sheet metal skeleton 10 immediately after being stamped out, the sheet metal being subsequently deformed by deep drawing, for example, in the area of the closed annular portion 12 that will form the skeleton section for the steering wheel rim. In the portion 12, the outer edge 14 is deformed such that the cross-section of the annular portion 12 acquires an open hollow profile as is shown in FIG. 2, i.e. the portion has one open side. After the shaping, the edge 14 projects upwards, as is shown by the broken lines.

An annular body 16, for example, made of cellulose or of an inexpensive plastic injection-molded material, is inserted into the open hollow profile and attached to the hollow profile by gluing or the like. Subsequently, the edge 14, which faces upwards, is bent in the direction of the arrow in order to further close the open hollow profile. In this method, the sheet metal comes to lie against the body 16. After the virtual but not complete closing of the hollow profile, the body 16, which serves as a spacer, almost completely fills the hollow profile.

Subsequently, the skeleton provided with the body 16 is inserted into a foaming mold and is foam-cased. The foam-cased part is designated as 20. Optionally, leather 22 can be applied subsequently as well.

The material of the body 16 can be more stable than the material of the skeleton 10 but, as in the present case, it can also have a lower tensile and flexural strength than the material of the skeleton 10.

Finally, the steering wheel made by means of the above-mentioned method has a closed annular steering wheel rim 24 provided with a sheathing of foam and/or leather, as well as spokes 26 coming from the steering wheel rim and extending to a hub.

The body 16 prevents a penetration of the foam 20 into the inside of the hollow profile, i.e. the profile does not have to be completely closed after insertion of the body.

Figure 3:
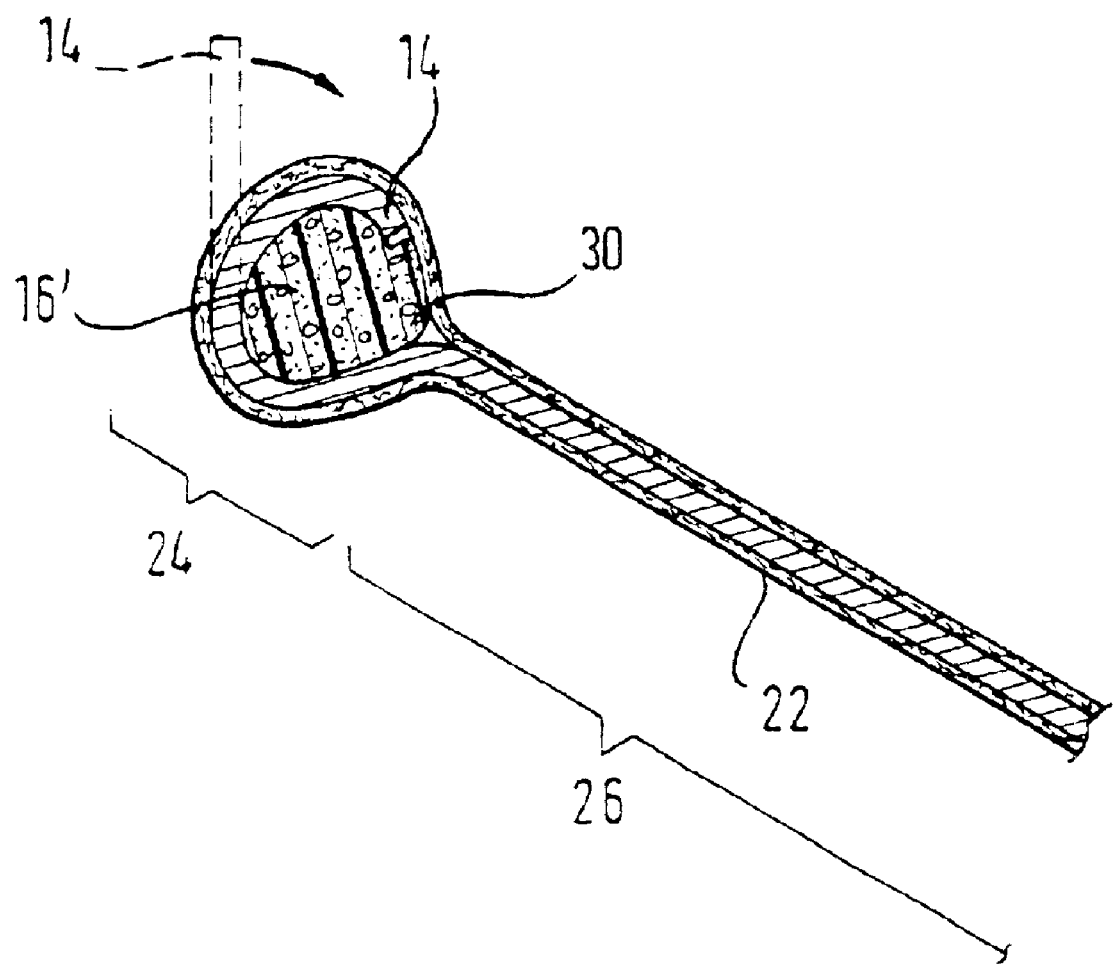
FIG. 3 shows a section through the steering wheel made by means of the method according to the invention in a second embodiment along a spoke and perpendicular to the steering wheel rim.

In the embodiment according to FIG. 3, the skeleton is only partially or not at all foam-cased. In the area of the steering wheel rim 24 shown in FIG. 3, a body 16' was inserted into the hollow profile and, in contrast to the body 16 according to FIG. 2, this body 16' also has a projection 30 that has the same thickness as the sheet metal and that gives the steering wheel rim 14 a closed outer surface after the virtual closing of the hollow profile, since the outer surface of the projection 30 lies flush with the outer surface of the inward-bent edge 14.

As an alternative to the embodiments shown, the body can also be attached to the sheet metal according to FIG. 1 before it is deformed, so that the body is already present in the hollow profile when the latter is being manufactured.

What is claimed is:

1. A method of producing a steering wheel that comprises an annular steering wheel rim and spokes, and further comprises a one-piece steering wheel skeleton as well as a sheathing therefore, said sheathing being one of the elements of a list comprising a foam covering and a leather covering, said sheathing surrounding said steering wheel skeleton, said method comprising the following steps:

a) producing said one-piece steering wheel skeleton having, in order to define said steering wheel rim, an annular portion with a cross-section having a hollow profile, b) placing a body that serves as a spacer in said hollow profile in order to almost completely fill said hollow profile, c) deforming said one-piece steering wheel skeleton in an area of said annular portion such that said hollow profile is closed without being fully closed, and d) providing said closed, but not fully closed steering wheel skeleton with said sheathing at least in an area of said steering wheel rim.

2. The method according to claim 1, wherein, after closing of said hollow profile, said body fills an inside of said hollow profile to such an extent that any penetration of foam into said inside of said hollow profile is prevented.

3. The method according to claim 1, wherein said steering wheel skeleton is preferably made of sheet metal that is deformed in an area of said annular portion so as to form said hollow profile.

4. The method according to claim 1, wherein said body is attached in said hollow profile of said one-piece steering wheel skeleton.

5. The method according to claim 1, wherein said body is made of a material the tensile and flexural strength of which is lower than that of said material of said one-piece steering wheel skeleton.

6. The method according to claim 5, wherein said body is made of cellulose.

7. The method according to claim 1, wherein said annular portion of said one-piece steering wheel skeleton extends only partially around said body.

8. The method according to claim 1, wherein at least part of a cross section of said body remains exposed to said sheathing during said providing step while another part of said cross section is separated from said sheathing during said providing step.

\* \* \* \* \*